United States Patent
Yano et al.

(10) Patent No.: US 7,734,416 B2
(45) Date of Patent: Jun. 8, 2010

(54) AUTOMATIC VEHICLE BRAKING DEVICE

(75) Inventors: Takuto Yano, Tokyo (JP); Shinji Taniguchi, Tokyo (JP); Yuji Shimizu, Hyogo (JP); Atsushi Yuyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/415,094

(22) Filed: May 2, 2006

(65) Prior Publication Data

US 2007/0129891 A1 Jun. 7, 2007

(30) Foreign Application Priority Data

Nov. 28, 2005 (JP) ............................. 2005-341525

(51) Int. Cl.
*G08G 1/16* (2006.01)

(52) U.S. Cl. ........................... 701/301; 701/36; 701/45; 701/70; 701/93; 701/96; 701/300; 701/302; 340/435; 340/436; 340/903; 342/29; 342/41; 342/74; 342/75; 342/77; 342/173; 342/174; 342/357.06; 342/357.09; 342/357.14; 342/455; 280/777; 180/232

(58) Field of Classification Search .................. 701/70, 701/93, 96, 300, 301, 302, 6, 45; 340/435, 340/436, 903; 345/74, 75, 77, 173, 174; 342/29, 41, 74, 75, 77, 173, 174, 357.06, 342/357.09, 357.14, 455; 700/255; 280/277

See application file for complete search history.

(56) References Cited

U.S. PATENT DOCUMENTS

| 5,314,037 | A | * | 5/1994 | Shaw et al. ................. 180/169 |
| 5,467,283 | A | * | 11/1995 | Butsuen et al. ............. 701/301 |
| 5,495,254 | A | * | 2/1996 | Uemura et al. .............. 342/174 |
| 5,818,355 | A | * | 10/1998 | Shirai et al. ................. 340/903 |
| 5,983,161 | A | * | 11/1999 | Lemelson et al. ........... 701/301 |
| 6,105,705 | A | * | 8/2000 | Faye ........................... 180/275 |
| 6,267,194 | B1 | * | 7/2001 | Bullinger et al. ............ 180/275 |
| 6,269,307 | B1 | * | 7/2001 | Shinmura et al. ........... 701/301 |
| 6,282,483 | B1 | * | 8/2001 | Yano et al. .................... 701/96 |
| 6,364,433 | B1 | * | 4/2002 | Stemer ........................ 303/138 |
| 6,370,475 | B1 | * | 4/2002 | Breed et al. ................. 701/301 |
| 6,393,361 | B1 | * | 5/2002 | Yano et al. .................. 701/301 |

(Continued)

FOREIGN PATENT DOCUMENTS

JP 07-021500 A 1/1995

(Continued)

*Primary Examiner*—Khoi Tran
*Assistant Examiner*—Jorge O Peche
(74) *Attorney, Agent, or Firm*—Sughrue Mion, PLLC

(57) ABSTRACT

The automatic vehicle braking device is equipped with a braking force control processing portion which, based on the judgment result of a collision judgment processing portion and the judgment result of a steering avoidance judgment processing portion, imparts a turning property in a direction of head-on collision to the vehicle when the lateral position of the obstacle with respect to a travel route curve is large in a condition in which the driver is unconscious of a high possibility of collision between the vehicle and the obstacle and has taken no steering avoidance action yet. As a result, it is possible to reduce the speed of the vehicle and, at the same time, mitigate the damage suffered by the vehicle occupants at the time of collision.

4 Claims, 14 Drawing Sheets

U.S. PATENT DOCUMENTS

| | | | |
|---|---|---|---|
| 6,405,132 B1 * | 6/2002 | Breed et al. | 701/301 |
| 6,408,248 B1 * | 6/2002 | Yancey et al. | 701/301 |
| 6,526,352 B1 * | 2/2003 | Breed et al. | 701/213 |
| 6,571,176 B1 * | 5/2003 | Shinmura et al. | 701/301 |
| 6,720,920 B2 * | 4/2004 | Breed et al. | 342/386 |
| 6,768,944 B2 * | 7/2004 | Breed et al. | 701/301 |
| 6,820,006 B2 * | 11/2004 | Patera | 701/301 |
| 6,971,727 B2 * | 12/2005 | Yoshizawa et al. | 303/193 |
| 7,016,783 B2 * | 3/2006 | Hac et al. | 701/301 |
| 2001/0003810 A1 * | 6/2001 | Shinmura et al. | 701/301 |
| 2003/0055563 A1 * | 3/2003 | Jonas Lars et al. | 701/301 |
| 2003/0227217 A1 * | 12/2003 | Yoshizawa et al. | 303/193 |
| 2004/0088097 A1 * | 5/2004 | Fujinami et al. | 701/70 |
| 2004/0193374 A1 * | 9/2004 | Hac et al. | 701/301 |
| 2005/0134440 A1 * | 6/2005 | Breed | 340/435 |
| 2005/0149251 A1 * | 7/2005 | Donath et al. | 701/200 |
| 2006/0031015 A1 * | 2/2006 | Paradie | 701/301 |
| 2006/0190175 A1 * | 8/2006 | Moriizumi et al. | 701/301 |
| 2007/0129891 A1 * | 6/2007 | Yano et al. | 701/301 |

FOREIGN PATENT DOCUMENTS

| | | |
|---|---|---|
| JP | 10258722 | 9/1998 |
| JP | 2003063430 | 3/2003 |
| JP | 2004224309 | 8/2004 |
| JP | 2005-028992 A | 2/2005 |
| JP | 2005-041465 A | 2/2005 |

* cited by examiner

AUTOMATIC VEHICLE BRAKING DEVICE

BACKGROUND OF THE INVENTION

1. Field of the Invention

The present invention relates to an automatic vehicle braking device, in particular, an automatic vehicle braking device for automatically braking a vehicle when there is a possibility of collision between the vehicle and an obstacle.

2. Description of the Related Art

Vehicle travel safety devices have conventionally been proposed. For example, there has been proposed a device in which travel environment factors about a vehicle, more specifically, the distance (inter-vehicle distance) to a vehicle ahead and the relative speed of the vehicle ahead with respect to one's vehicle are detected. When the distance between one's vehicle and the obstacle (the vehicle ahead) has become smaller than a predetermined distance, there is generated a deceleration (primary braking) capable of letting the driver know that a braking force has been generated by an automatic brake device. When the state in which the distance between one's vehicle and the object (the vehicle ahead) is within the predetermined distance persists for a predetermined period of time, a further deceleration is generated (secondary braking). In the above-described conventional device, the braking force generated to brake the vehicle is basically imparted uniformly to the right and left wheels to thereby brake the vehicle (see JP 2005-041465 A).

In another conventional device proposed, which is a further improvement over the above-described one disclosed in JP 2005-041465 A, the start of the operation of a vehicle occupant protecting device such as a seat belt, and of the brake device, is expedited according to the lap rate when the vehicle is to collide with an obstacle based on width-related information such as the width of the obstacle and its position in the width direction with respect to one's vehicle (see, for example, JP 2005-28992 A).

Further, there has been proposed a device in which, to cope with a situation in which the driver takes a steering avoidance action while a conventional device of the type as disclosed in JP 2005-28992 A is exerting a braking force, the distance between one's vehicle and the obstacle and the relative speed thereof are detected to make a judgment as to whether there is a possibility that they come into contact with each other. When a steering operation performed by the driver is detected in the case in which it is determined that there is a possibility of contact, brake pressure is controlled for each wheel such that the turning property of the vehicle in that steering direction is enhanced (see, for example, JP 07-21500 A).

However, the conventional device as disclosed in JP 2005-041465 A has the following problem. That is, a braking force is generated uniformly in the right and left wheels, which merely produces the effect of reducing the speed of the vehicle. When the vehicle collides with an obstacle while offsetting with respect thereto (hereinafter referred to as offset collision), the damage suffered by the vehicle occupants is more serious as compared with that in the case of a head-on collision.

The conventional device as disclosed in JP 2005-28992 A has a problem in that no consideration is taken of how to cope with a situation in which the driver takes a steering avoidance action while a braking force is being exerted.

On the other hand, when, as in JP 07-21500 A, the turning property of the vehicle is excessively enhanced after the steering avoidance action by the driver, the operational stability of the vehicle may be deteriorated.

SUMMARY OF THE INVENTION

The present invention has been made with a view toward solving the above problems in the prior art. It is an object of the present invention to provide an automatic vehicle braking device which helps to mitigate the damage suffered by the vehicle occupants when the vehicle is going to undergo offset collision with an obstacle and which can allow the driver leeway in taking a steering avoidance action without excessively enhancing the turning property of the vehicle to deteriorate the operational stability of the vehicle.

According to the present invention, there is provided an automatic vehicle braking device including: detection means for detecting a relative distance, lateral position, and speed of an obstacle with respect to one's vehicle; collision judgment means for making a judgment as to whether a possibility of collision between one's vehicle and the obstacle exists based on detection values obtained by the detection means; steering operation detecting means for detecting a steering operation by a driver; and braking force control means for causing a braking force to be exerted on each wheel to brake the vehicle when it is judged by the collision judgment means that is a possibility of collision exist and when the steering operation detecting means has detected no collision avoidance operation performed by the driver.

According to the present invention, there is provided an automatic vehicle braking device including: detection means for detecting a relative distance, lateral position, and speed of an obstacle with respect to one's vehicle; collision judgment means for making a judgement as to whether a possibility of collision of one's vehicle and the obstacle exists based on detection values obtained by the detection means; steering operation detecting means for detecting a steering operation by a driver; and braking force control means for causing a braking force to be exerted on each wheel to brake the vehicle when it is judged by the collision judgment means that a possibility of collision exists and when the steering operation detecting means has detected no collision avoidance operation performed by the driver. As a result, it is possible to realize an automatic braking which helps to mitigate the damage suffered by the vehicle occupants when the vehicle is going to undergo offset collision with the obstacle and which can allow the driver leeway in taking a steering avoidance action without excessively enhancing the turning property of the vehicle to deteriorate the operational stability of the vehicle.

DETAILED DESCRIPTION OF THE PREFERRED EMBODIMENTS

Embodiment 1

Figure 1:
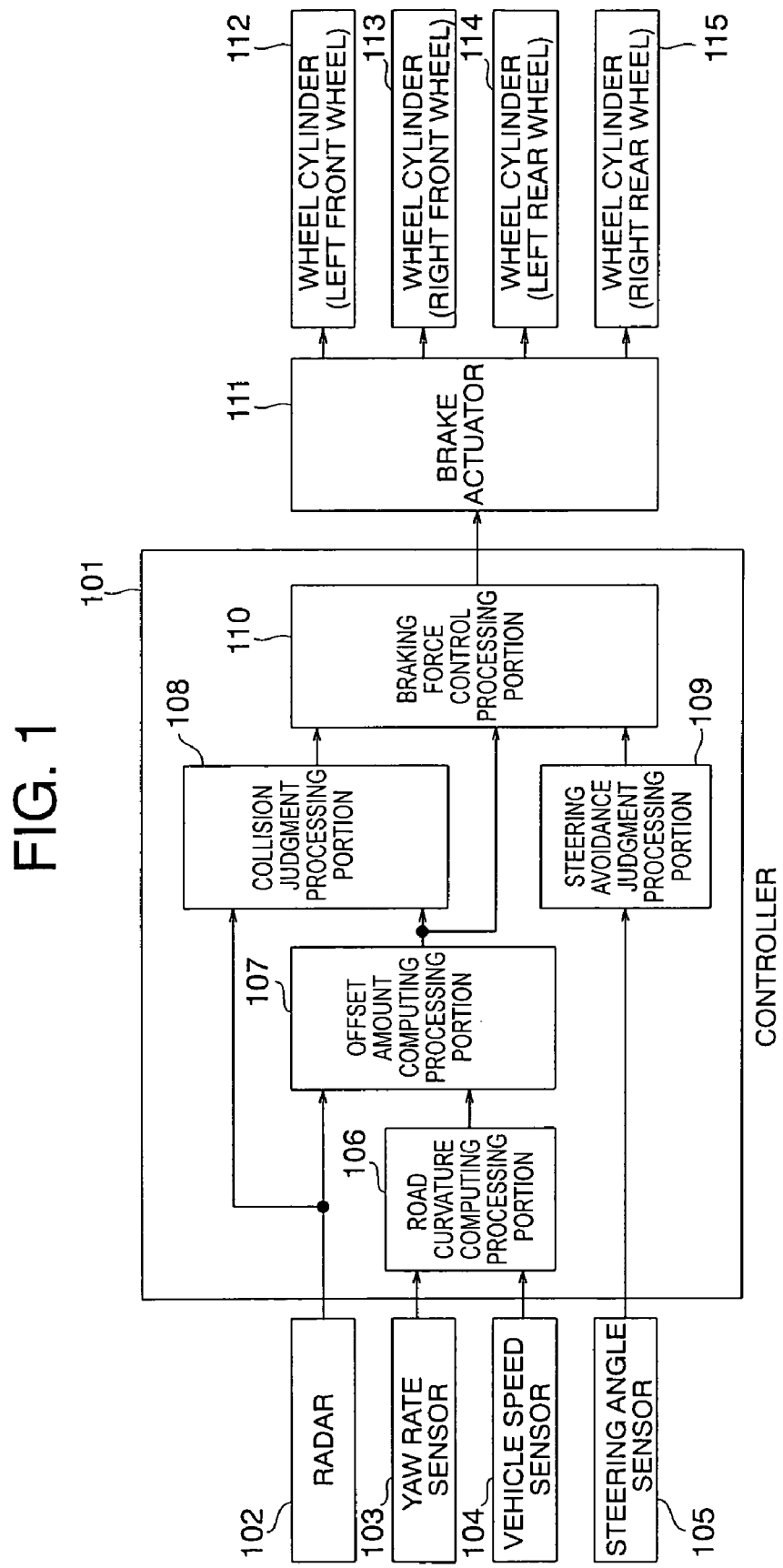
FIG. 1 is a schematic diagram showing a construction of an automatic vehicle braking device according to Embodiment 1 of the present invention.

An automatic vehicle braking device according to Embodiment 1 of the present invention will be described. FIG. 1 shows a construction of the automatic vehicle braking device of this embodiment. As shown in FIG. 1, connected to a controller 101 are a radar 102, a yaw rate sensor 103, a vehicle speed sensor 104, and a steering angle sensor 105.

Based on input information from the various sensors 102 through 105 externally connected to the controller 101, the controller 101 executes a computation for controlling various externally connected actuators described below.

The radar 102 serves to measure the relative distance, lateral position, and speed with respect to one's vehicle of each of a plurality of obstacles existing within a specific range ahead of one's vehicle.

The yaw rate sensor 103 is a sensor for detecting the yaw rate of one's vehicle.

The vehicle speed sensor 104 is a sensor for detecting the speed of one's vehicle.

The steering angle sensor 105 is a sensor for detecting a steering angle attained through operation by the driver.

As shown in FIG. 1, the controller 101 is equipped with a road curvature computing processing portion 106, an offset amount computing processing portion 107, a collision judgment processing portion 108, a steering avoidance judgment processing portion 109, and a braking force control processing portion 110.

The road curvature computing processing portion 106 estimates the curvature of the road on which one's vehicle is travelling based on output signals from the vehicle speed sensor 104 and the yaw rate sensor 103.

The offset amount computing processing portion 107 calculates the difference (offset amount) between the vehicle travel route determined by the road curvature estimated by the road curvature computing processing portion 106 and the lateral position of an obstacle.

The collision judgment processing portion 108 makes a judgment as to whether there exists among a plurality of obstacles as output by the radar 102 an object that may collide with one's vehicle based on output signals from the radar 102 and the positions of the obstacles with respect to the lane center output by the offset amount computing processing portion 107.

The steering avoidance judgment processing portion 109 makes a judgment as to whether a steering avoidance action by the driver is being taken or not based on the steering angle output from the steering angle sensor 105.

The braking force control processing portion 110 generates target values of the braking force to be generated in the vehicle and of the yaw moment based on the judgment result of the collision judgment processing portion 108, the offset amount computed by the offset amount computing processing portion 107, and the judgment result of the steering avoidance judgment processing portion 109.

As shown in FIG. 1, a brake actuator 111 is connected to the controller 101.

The brake actuator 111 is capable of adjusting the pressures of wheel cylinders 112, 113, 114, and 115 to exert a braking force on the front and rear wheels.

Here, the wheel cylinder 112 is a wheel cylinder for generating a braking force for the left front wheel, the wheel cylinder 113 is a wheel cylinder for generating a braking force for the right front wheel, the wheel cylinder 114 is a wheel cylinder for generating a braking force for the left rear wheel, and the wheel cylinder 115 is a wheel cylinder for generating a braking force for the right rear wheel.

Figure 2:
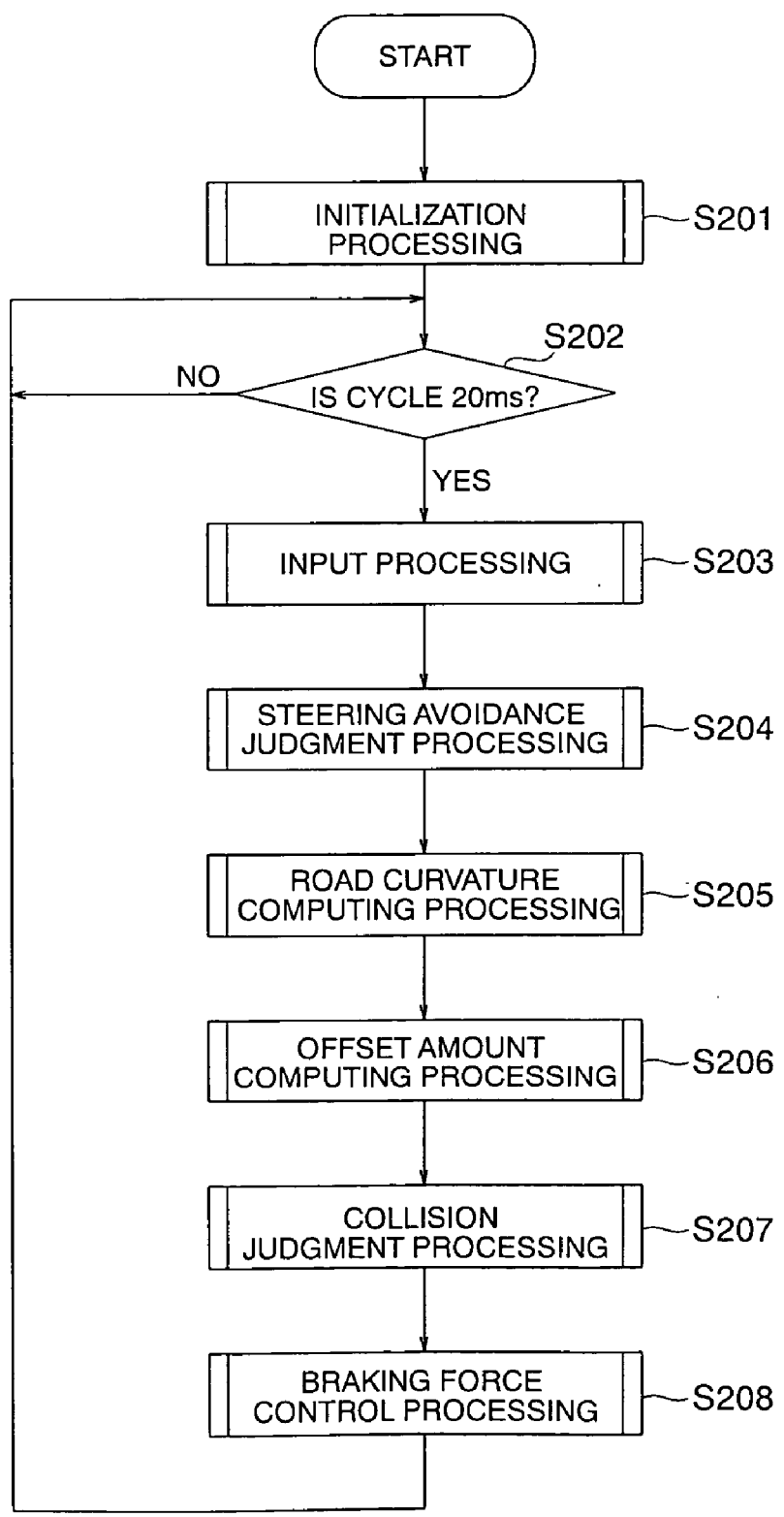
FIG. 2 is a flowchart illustrating the general flow of procedures executed by a controller of the automatic vehicle braking device according to Embodiment 1 according to the present invention.

Next, the processing executed by the controller 101 will be described. FIG. 2 is a flowchart showing the processing to be executed by the controller 101.

First, in step S201, various variables to be treated by the controller 101 are initialized, and the state of the brake actuator 111 connected to the controller 101 is initialized.

Next, in step S202, to control the computation cycle of this flowchart to 20 ms, the procedure is held on standby in this step until 20 ms has elapsed after the previous execution cycle. When 20 ms has elapsed, the procedure advances to step S203.

In step S203, the output signals from the radar 102, the yaw rate sensor 103, the vehicle speed sensor 104, and the steering angle sensor 105 are stored.

In step S204, it is determined that a steering avoidance action by the driver is being taken when the steering angle output by the steering angle sensor 105 (or the steering angle velocity obtained through differentiation of the steering angle) is larger than a predetermined value. Otherwise, it is determined that no steering avoidance action is being taken.

In step S205, the curvature 1/R of the road on which one's vehicle is traveling is computed from equation (1) by using the input signals of the yaw rate sensor 103 and the vehicle speed sensor 104.

$$1/R = \gamma/V \tag{1}$$

where $\gamma$: yaw rate [rad/s], and V: vehicle speed [m/s]

Figure 3:
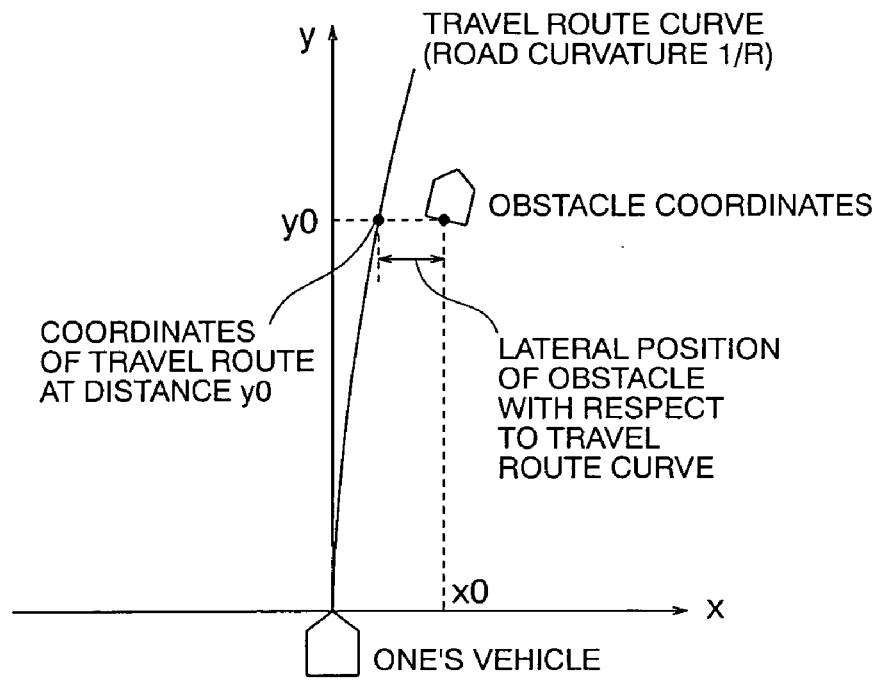
FIG. 3 is an explanatory view for illustrating a lateral position of an obstacle with respect to a travel route curve of the automatic vehicle braking device according to Embodiment 1 of the present invention.

As shown in FIG. 3, in step S206, as for all the obstacles as detected by the radar 102, the lateral positions thereof with respect to the travel route curve are obtained. For the sake of convenience, in this embodiment, it is assumed that only one obstacle exists. Suppose that the relative distance between this single obstacle and one's vehicle is x0 [m], that the lateral position thereof is y0 [m] (hereinafter the coordinates of this obstacle will be expressed as (x0, y0)), and that the relative speed thereof is Vr0 [m/s]. First, the value of the x-coordinate (xlane) of the point where the travel route curve determined by the road curvature 1/R estimated in step S205 is crossed by the straight line indicating the distance y0 to the obstacle is computed from equation (2).

$$x\text{lane} = 1/R \times y0^2/2 \tag{2}$$

Further, the lateral position of the obstacle with respect to the travel route curve, dx0, is computed from equation (3) based on the lateral position of the obstacle, x0, and the x-coordinate value, xlane, of the travel route curve at the distance, y0.

$$dx0 = x0 - x\text{lane} \tag{3}$$

Figure 4:
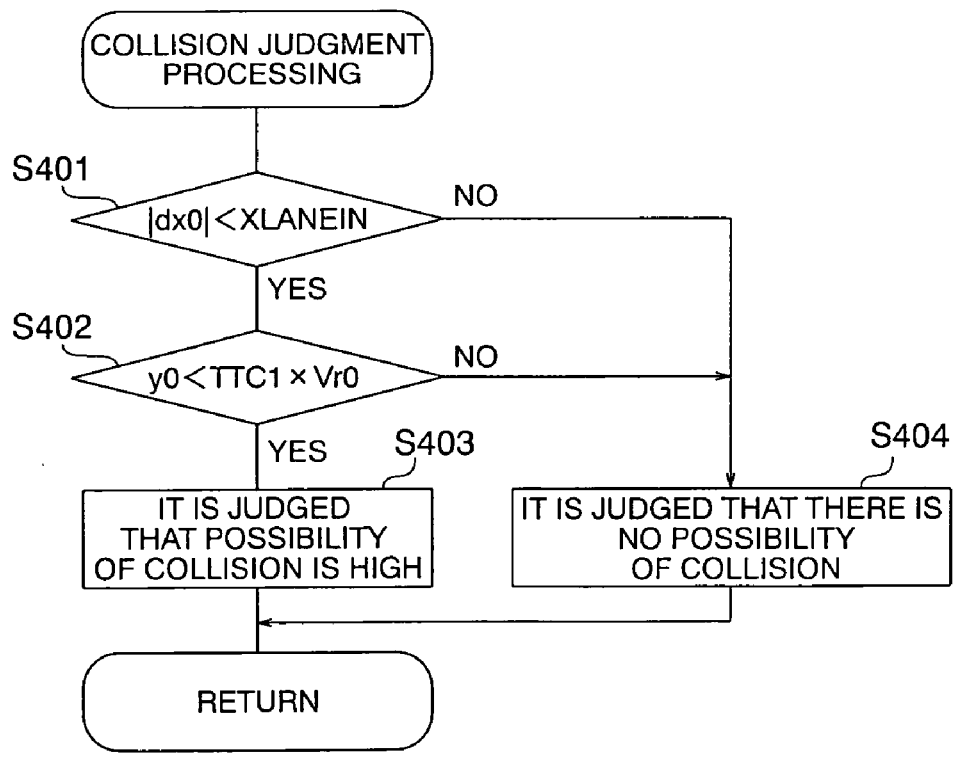
FIG. 4 is a flowchart for illustrating in detail a collision judgment processing of the automatic vehicle braking device according to Embodiment 1 of the present invention.

Next, in step S207, based on the output signal from the radar 102 and the position of the obstacle with respect to the lane center output from the offset amount computing processing portion 107, a judgment is made as to whether there exists an object that may collide with one's vehicle among a plurality of obstacles output from the radar 102. FIG. 4, which is a flowchart illustrating this judgment processing in detail, will be referred to below.

Figure 6:
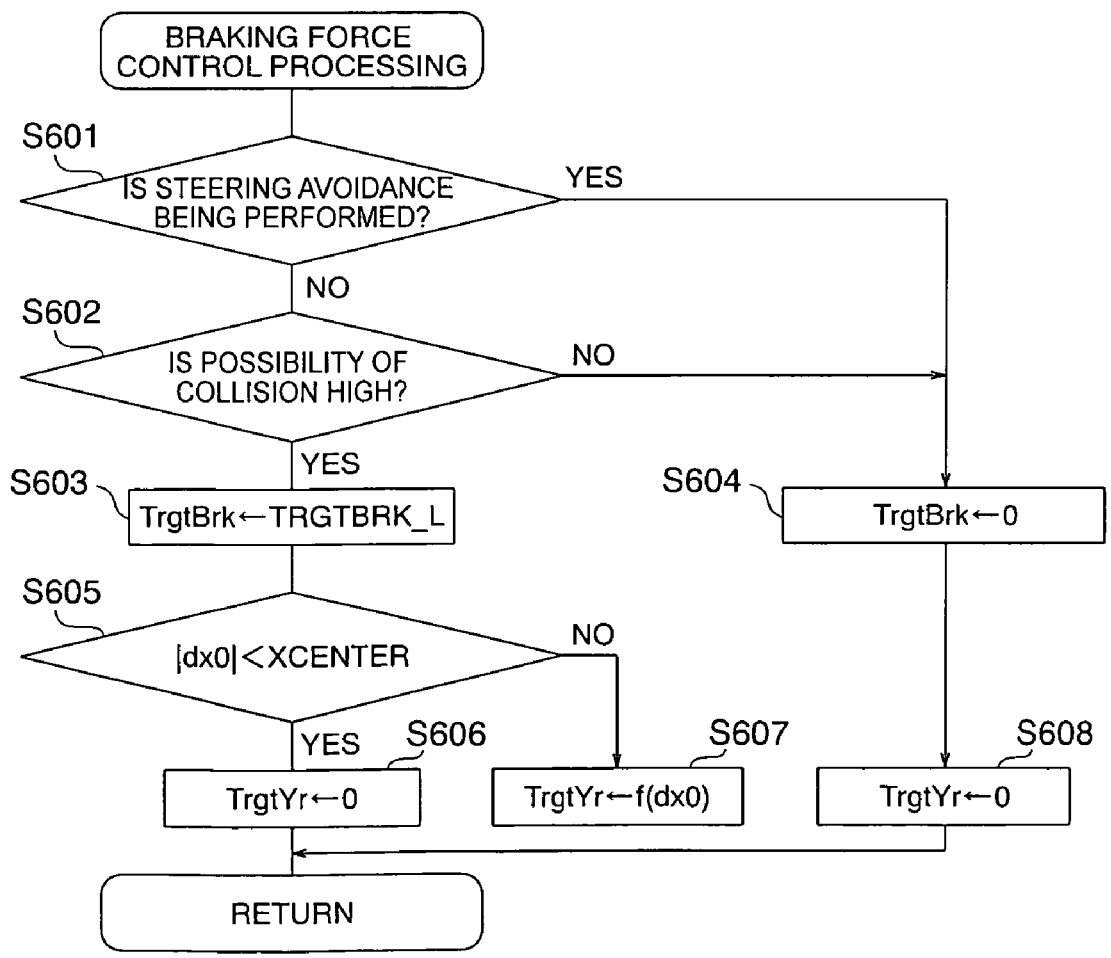
FIG. 6 is a flowchart for illustrating in detail a braking force control processing of the automatic vehicle braking device according to Embodiment 1 of the present invention.

Next, in step S208, the target values of the braking force to be generated in the vehicle and of the yaw moment are produced based on the judgment result of the collision judgment processing step S207, the offset amount computed in the offset amount computing processing step S206, and the judgment result of the steering avoidance judgment processing step S204. FIG. 6, which is a flowchart illustrating this processing in detail, will be referred to below.

The processing shown in FIG. 4 will be described. FIG. 4 is a detailed flowchart illustrating the collision judgment processing of step S207.

First, in step S401, the absolute value of the lateral position dx0 of the obstacle with respect to the travel route curve and a predetermined threshold XLANEIN [m] are compared with each other. When |dx0|<XLANEIN, the procedure advances to step S402. Otherwise, the procedure advances to step S404.

Figure 5:
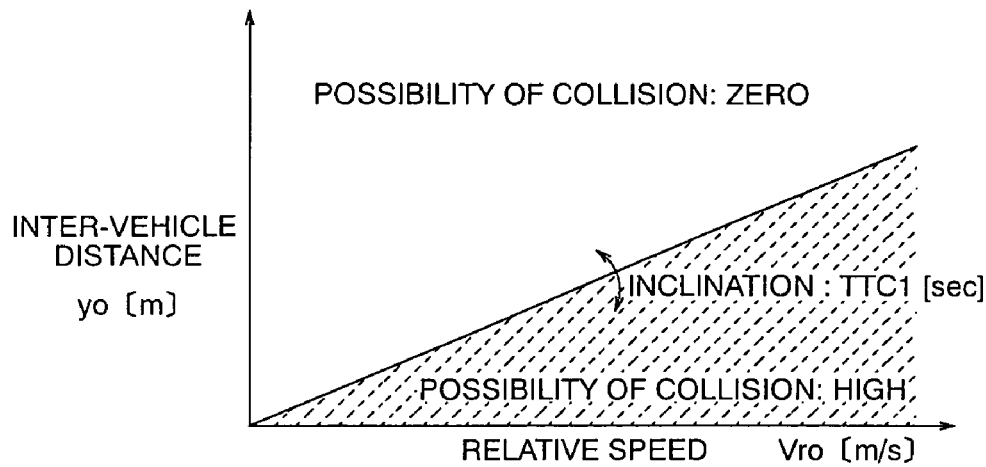
FIG. 5 is an explanatory view for illustrating a steering avoidance limit inter-vehicle distance for the collision judgment processing of the automatic vehicle braking device according to Embodiment 1 of the present invention.

In step S402, the distance y0 to the obstacle is compared with a distance obtained by multiplying a predetermined collision prediction time TTC1 by the relative speed Vr0 of the obstacle (that is, the value of (TTC1×Vr0)), and by using the distance y0 to the obstacle and the relative speed Vr0, a judgment is made as to whether the obstacle is an object belonging to the shaded region of FIG. 5. In FIG. 5, the horizontal axis indicates the relative speed (Vr0 [m/s]), and the vertical axis indicates the inter-vehicle distance (y0 [m]). The figure provides a graph of y0=TTC1×Vr0, and the region below the same (the region where y0<TTC1×Vr0) is shaded. When the judgment result in step S402 is y0<TTC1×Vr0, the procedure advances to step S403. Otherwise, the procedure advances to step S404. Assuming that there is no change in the relative speed of one's vehicle and the obstacle ahead, the collision prediction time TTC1 is a value defined as the requisite time for one's vehicle to collide with the obstacle ahead, or the requisite time for lateral movement by a specific collision avoidance width. The collision prediction time TTC1 is set such that the distance obtained from TTC1×Vr0 is the physical avoidance limit allowing collision avoidance by steering.

In step S403, it is judged that the possibility of collision is high.

On the other hand, in step S404, it is judged that there is no (or low) possibility of collision.

The processing illustrated in FIG. 6 will be described. FIG. 6 is a detailed flowchart illustrating the braking force control processing in step S208.

First, in step S601, using the judgment result of the steering avoidance judgment processing of step S204, a judgment is made as to whether the driver is performing steering avoidance or not. When the driver is performing steering avoidance, it is determined that there is no need to operate the device, and the procedure advances to step S604. Otherwise, the procedure advances to step S602.

In step S602, the judgment result of the collision judgment processing of step S207 is used to make a judgment as to whether the possibility of collision is high or not. When the possibility of collision is high, the procedure advances to step S603. Otherwise, (that is, when the possibility of collision is low or zero), it is determined that there is no need to operate the device, and the procedure advances to step S604.

In step S603, to operate the device to brake the vehicle, the target braking force TrgtBrk is set at a predetermined amount TRGTBRK_L.

In step S604, the target braking force TrgtBrk is set at 0.

In step S605, the absolute value of the lateral position dx0 of the obstacle with respect to the travel route curve is compared with a predetermined value XCENTER. When |dx0|<XCENTER, it is determined that there is no need to correct the travel route, and the procedure advances to step S606. Otherwise, the procedure advances to step S607 to correct the travel route to effect head-on collision.

In step S606, the target yaw rate TrgtYr is set at 0. As a result, a target braking force of TRGTBRK_L and a target yaw rate of zero are given to the brake actuator 111, so uniform braking forces are generated in the right and left wheels, and the vehicle is braked, with no turning property of the vehicle being imparted due to the braking force obtained through control of the controller 101.

Figure 7:
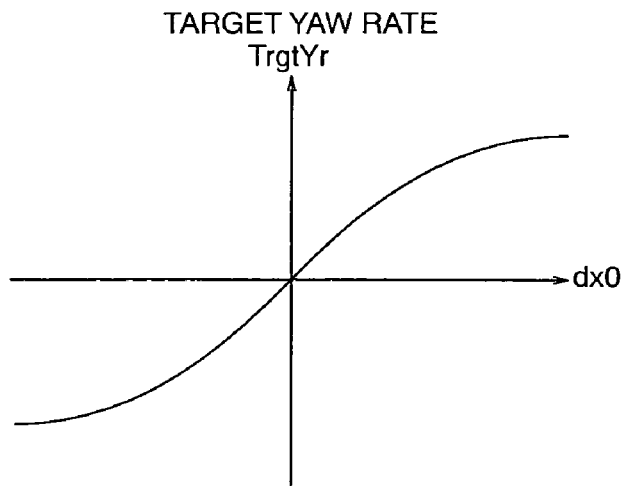
FIG. 7 is an explanatory view for illustrating a target yaw rate TrgtYr for the automatic vehicle braking device according to Embodiment 1 of the present invention.

As shown in FIG. 7, in step S607, the target yaw rate TrgtYr is set at a value proportional to the lateral position dx0 of the obstacle with respect to the travel route curve. As a result, a target braking force of TRGTBRK_L and a target yaw rate based on dx0 are given to the brake actuator 111, so different braking forces are generated in the right and left wheels. For example, braking force control is effected such that solely the braking force of the rear wheel on the outer side of cornering among all the wheels is somewhat reduced, or such that the braking force for the front wheel among the wheels on the outer side of cornering is somewhat reduced, with the braking force for the rear wheel on the inner side of cornering being enhanced. In this way, the vehicle is braked, with a turning property of the vehicle to cause head-on collision being imparted by the braking force obtained through control by the controller 101.

In step S608, the target yaw rate TrgtYr is set at 0. As a result, the vehicle is not braked.

As described above, in this embodiment, in a condition in which the driver is unconscious of a possibility of collision and steering avoidance action has not been taken by the driver yet although there is a high possibility of the vehicle colliding with an obstacle, braking is effected while imparting no turning property of the vehicle when the absolute value of the lateral position dx0 of the obstacle with respect to the travel route curve is smaller than XCENTER, and when the absolute value is larger than XCENTER, a turning property to cause head-on collision is imparted based on the value of dx0.

Thus, according to this embodiment, in a case in which one's vehicle is about to make an offset collision with an obstacle, the braking forces generated in the right and left wheels of the vehicle are controlled individually. As a result, the turning property of the vehicle is enhanced to thereby make it possible to automatically cause head-on collision. Thus, in addition to the conventional effect of mitigating the damage suffered by the vehicle occupants by reducing the vehicle speed, it is possible to attain the effect of further mitigating the damage of the vehicle occupants as compared with the case of offset collision.

Embodiment 2

The device construction of this embodiment is the same as that of FIG. 1, so a description of the device construction of this embodiment will be omitted. Further, the processing flow is the same as that of FIG. 2 except for the braking force control processing of step S208.

Figure 8:
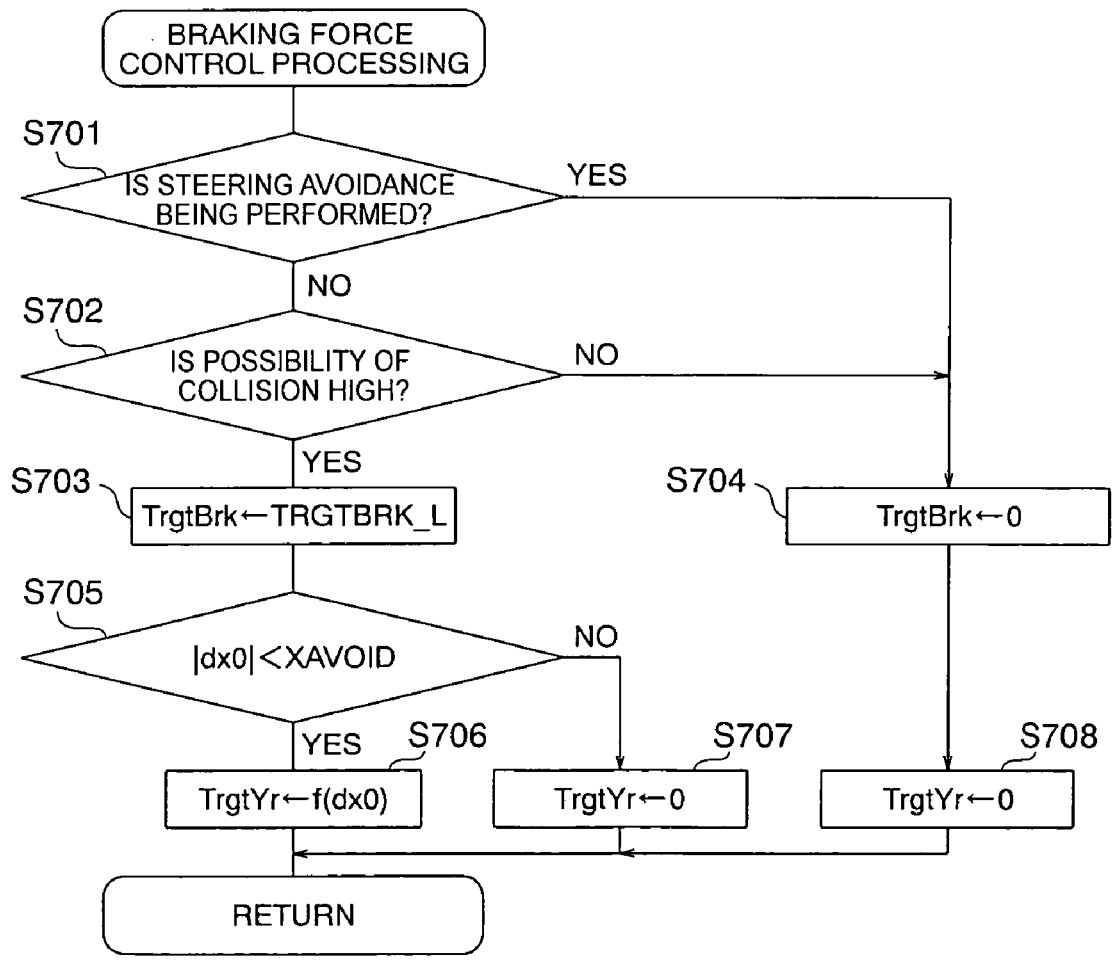
FIG. 8 is a flowchart for illustrating in detail a braking force control processing of an automatic vehicle braking device according to Embodiment 2 of the present invention.

The braking force control processing of step S208 of this embodiment will be described in detail. FIG. 8 is a detailed flowchart illustrating the processing.

First, in step S701, using the judgment result of the steering avoidance judgment processing of step S204, a judgment is made as to whether the driver is performing steering avoidance or not. When the driver is performing steering avoidance, it is determined that there is no need to operate the device, and the procedure advances to step S704. Otherwise, the procedure advances to step S702.

In step S702, the judgment result of the collision judgment processing of step S207 is used to make a judgment as to whether the possibility of collision is high or not. When the possibility of collision is high, the procedure advances to step S703. Otherwise (that is, when the possibility of collision is low or zero), it is determined that there is no need to operate the device, and the procedure advances to step S704.

In step S703, to operate the device to brake the vehicle, the target braking force TrgtBrk is set at a predetermined amount TRGTBRK_L.

In step S704, the target braking force TrgtBrk is set at 0.

In step S705, the absolute value of the lateral position dx0 of the obstacle with respect to the travel route curve is compared with a predetermined value XAVOID. When |dx0|≧XAVOID, the procedure advances to step S706 to correct the travel route to avoid collision. Otherwise, it is determined that there is no need to correct the travel route, and the procedure advances to step S707.

Figure 9:
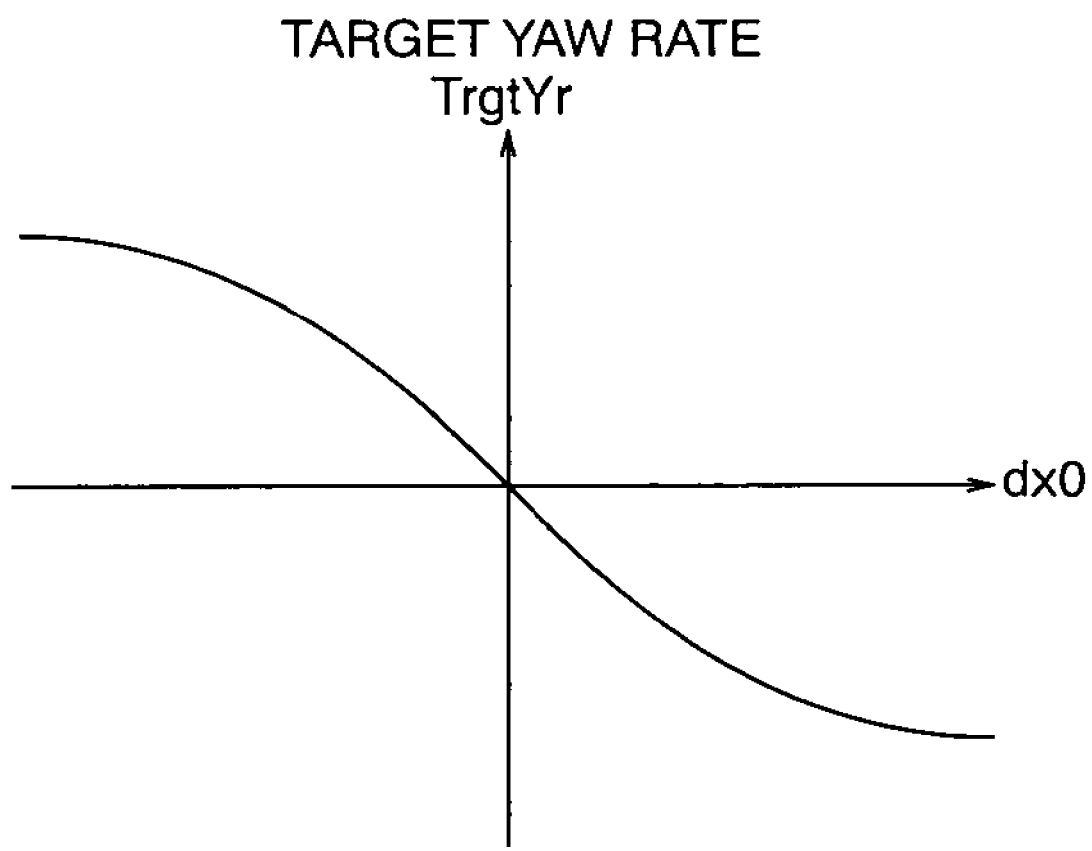
FIG. 9 is an explanatory view for illustrating a target yaw rate TrgtYr for the automatic vehicle braking device according to Embodiment 2 of the present invention.

As shown in FIG. 9, in step S706, the target yaw rate TrgtYr is set at a value proportional to the lateral position dx0 of the obstacle with respect to the travel route curve. As a result, a target braking force of TRGTBRK_L and a target yaw rate based on dx0 are given to the brake actuator 111, so different braking forces are generated in the right and left wheels. In this way, the vehicle is braked, with a turning property of the vehicle to avoid collision being imparted by the braking force obtained through control by the controller 101.

In step S707, the target yaw rate TrgtYr is set at 0. As a result, a target braking force of TRGTBRK_L and a target yaw rate of zero are given to the brake actuator 111, so that uniform braking forces are generated in the right and left wheels, and the vehicle is braked, with no turning property of the vehicle being imparted due to the braking force obtained through control of the controller 101.

In step S708, the target yaw rate TrgtYr is set at 0. As a result, the vehicle is not braked.

As described above, in this embodiment, in a condition in which the driver is unconscious of a possibility of collision, that is, in a case in which steering avoidance action has not been taken by the driver yet although there is a high possibility of the vehicle colliding with an obstacle, braking is effected while imparting no turning property of the vehicle when the absolute value of the lateral position dx0 of the obstacle with respect to the travel route curve is smaller than XAVOID, and, when the absolute value is larger than XAVOID, a turning property to avoid collision is imparted based on the value of dx0.

Thus, according to this embodiment, when one's vehicle is about to make an offset collision with an obstacle, the braking forces generated in the right and left wheels of the vehicle are controlled individually. As a result, the turning property of the vehicle is enhanced to automatically avoid collision. Thus, it is possible to allow the driver leeway in taking steering avoidance action, which may be performed immediately before collision. Further, there is no need take measures to excessively enhance the turning property of the vehicle as in JP 07-21500 A.

Embodiment 3

Figure 10:
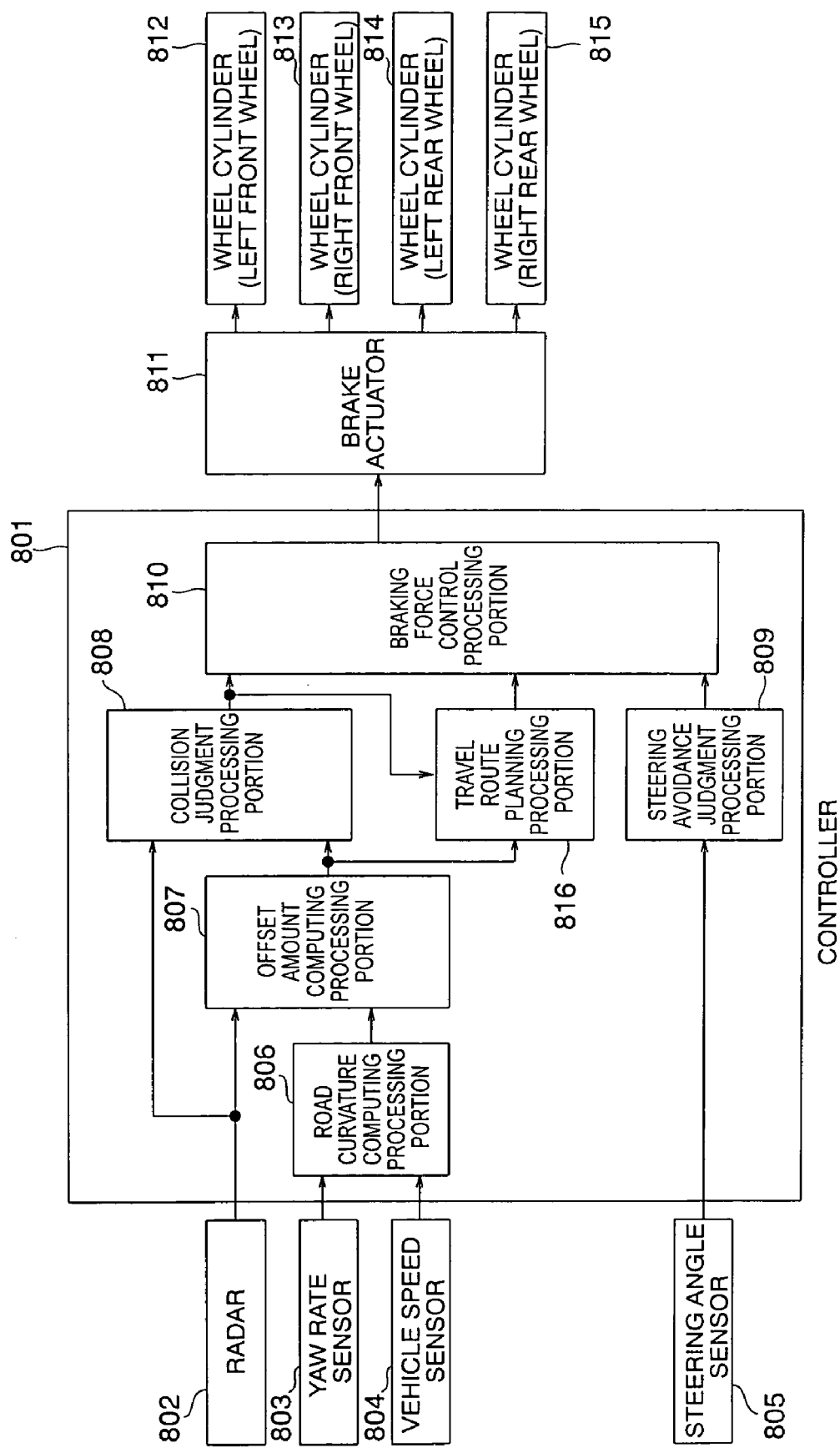
FIG. 10 is a schematic diagram showing a construction of an automatic vehicle braking device according to Embodiment 3 of the present invention.

FIG. 10 shows a construction of an automatic vehicle control device according to this embodiment. The components of this device are as shown in the figure. As shown in FIG. 10, connected to a controller 801 are a radar 802, a yaw rate sensor 803, a vehicle speed sensor 804, and a steering angle sensor 805.

Based on input information from the externally connected various sensors, the controller 801 executes a computation for controlling various actuators which are also externally connected.

The radar 802 serves to measure the relative distance, lateral position, and speed with respect to one's vehicle of each of a plurality of obstacles existing within a specific range ahead of one's vehicle.

The yaw rate sensor 803 is a sensor for detecting the yaw rate of one's vehicle.

The vehicle speed sensor 804 is a sensor for detecting the speed of one's vehicle.

The steering angle sensor 805 is a sensor for detecting a steering angle attained through operation by the driver.

As shown in FIG. 10, the controller 801 is equipped with a road curvature computing processing portion 806, an offset amount computing processing portion 807, a collision judgment processing portion 808, a steering avoidance judgment processing portion 809, and a braking force control processing portion 810, and a travel route planning processing portion 816.

The road curvature computing processing portion 806 estimates the curvature of the road on which one's vehicle is travelling based on output signals from the vehicle speed sensor 804 and the yaw rate sensor 803.

The offset amount computing processing portion 807 calculates the difference (offset amount) between the vehicle travel route determined by the road curvature estimated by the road curvature computing processing portion 806 and the lateral position of an obstacle.

The collision judgment processing portion 808 makes a judgment as to whether there exists among a plurality of obstacles as output by the radar 802 an object that may collide with one's vehicle based on output signals from the radar 802 and the positions of the obstacles with respect to the lane center output by the offset amount computing processing portion 807.

The steering avoidance judgment processing portion 809 makes a judgment as to whether a steering avoidance action by the driver is being taken or not based on the steering angle output from the steering angle sensor 805.

The braking force control processing portion 810 generates target values of the braking force to be generated in the vehicle and of the yaw moment based on the judgment result of the collision judgment processing portion 808, the offset amount computed by the offset amount computing processing portion 807, and the judgment result of the steering avoidance judgment processing portion 809.

A travel route planning processing portion 816 plans the travel route to be taken by one's vehicle when there is a trigger from the collision judgment processing portion 808, more specifically, when transition is effected from a state in which there is no possibility of collision to a state in which there is a high possibility of collision.

As shown in FIG. 10, a brake actuator 811 is connected to the controller 801.

The brake actuator 811 is capable of adjusting the pressures of wheel cylinders 812, 813, 814, and 815 to exert a braking force on the front and rear wheels.

Here, the wheel cylinder 812 is a wheel cylinder for generating a braking force for the left front wheel, the wheel cylinder 813 is a wheel cylinder for generating a braking force for the right front wheel, the wheel cylinder 814 is a wheel cylinder for generating a braking force for the left rear wheel, and the wheel cylinder 815 is a wheel cylinder for generating a braking force for the right rear wheel.

Figure 11:
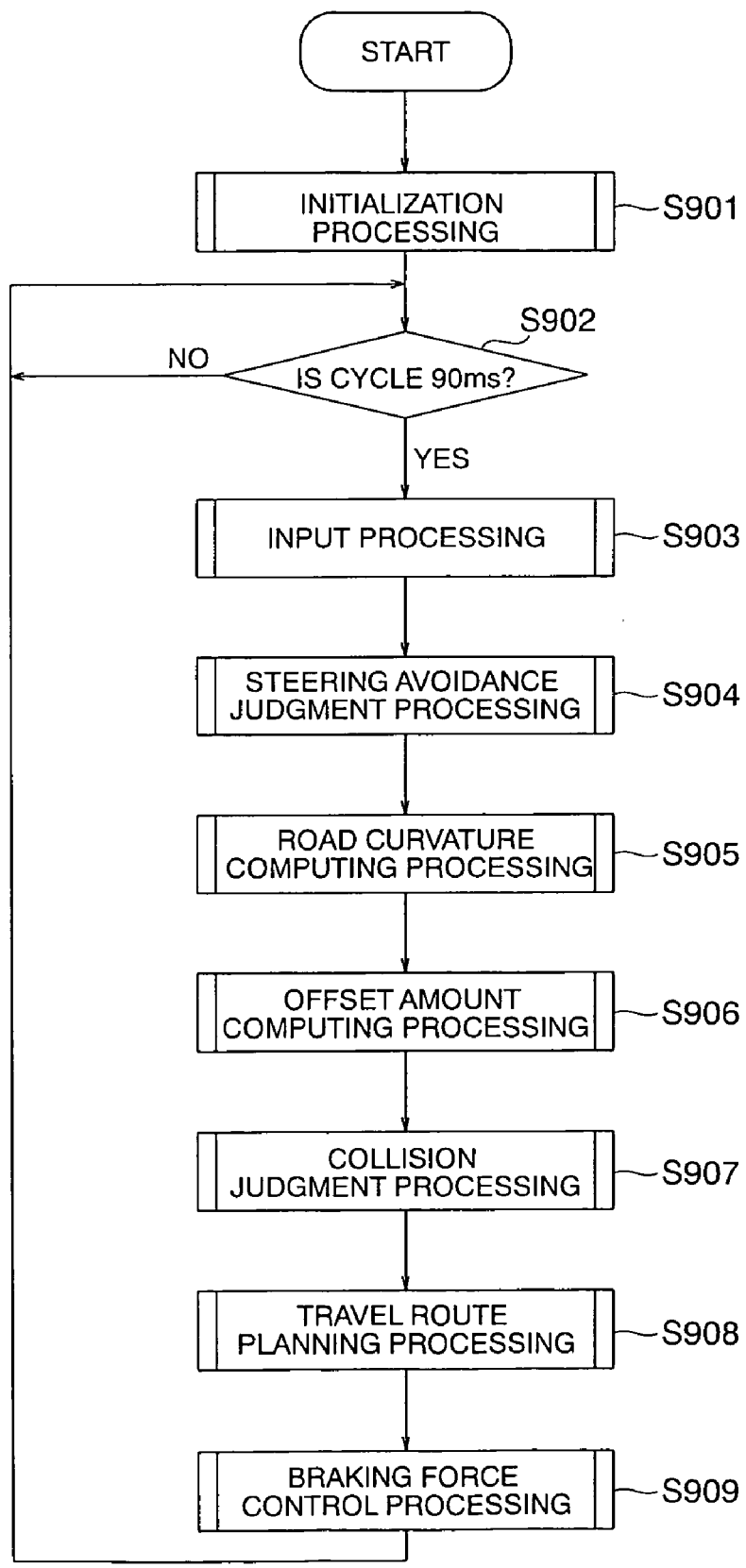
FIG. 11 is a flowchart for illustrating the general flow of procedures executed by a controller of the automatic vehicle braking device according to Embodiment 3 of the present invention.

Next, the processing executed by the controller 801 will be described. FIG. 11 is a flowchart showing the processing to be executed by the controller 801.

First, in step S901, various variables to be treated by the controller 801 are initialized, and the state of the brake actuator 811 connected to the controller 801 is initialized.

Next, in step S902, to control the computation cycle of this flowchart to 20 ms, the procedure is held on standby in this step until 20 ms has elapsed after the previous execution cycle. When 20 ms has elapsed, the procedure advances to step S903.

In step S903, the same input processing as that of step S203 is executed.

In step S904, the same steering avoidance processing as that of step S204 is executed.

In step S905, the same road curvature computing processing as that of step S205 is executed.

In step S906, the same offset amount computing processing as that of step S206 is executed.

In step S907, the same collision judgment processing as that of step S207 is executed.

Figure 12:
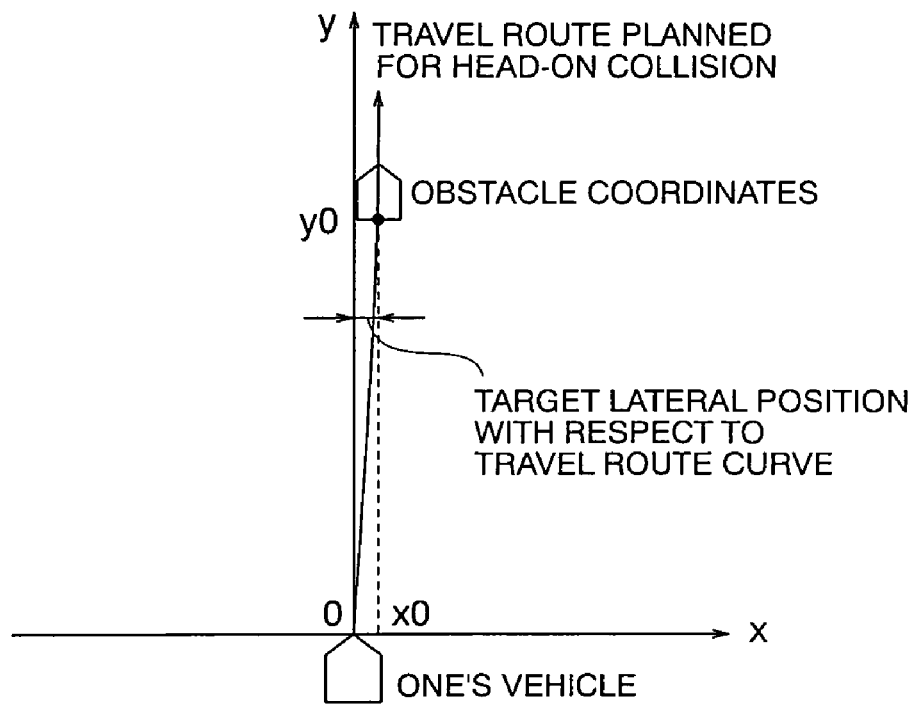
FIG. 12 is an explanatory view for illustrating a travel route planned for a head-on collision of the automatic vehicle braking device according to Embodiment 3 of the present invention.
Figure 13:
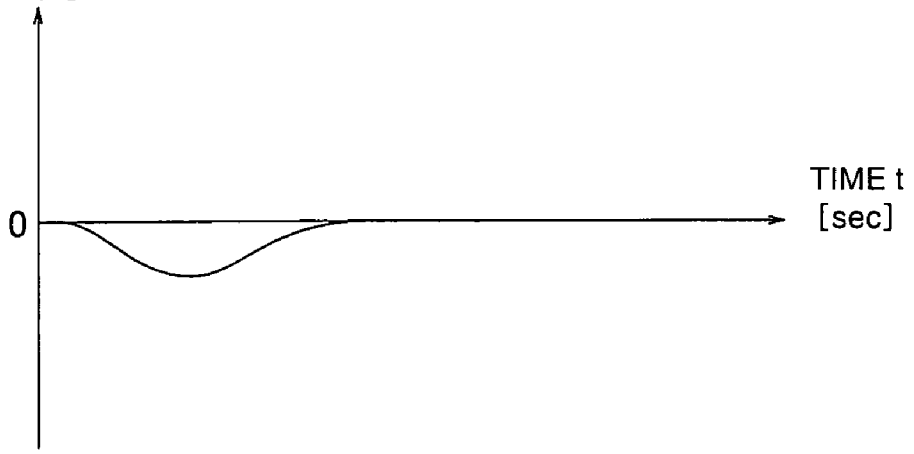
FIG. 13 is an explanatory view for illustrating a target yaw rate for realizing a travel route for a head-on collision of the automatic vehicle braking device according to Embodiment 3 of the present invention.

In step S908, when, in the collision judgment processing step S907, transition is effected from a state in which there is no possibility of collision to a state in which there is a high possibility of collision, a target yaw rate value is generated only once according to the travel route for head-on collision to be taken by the vehicle as shown in FIG. 12, more specifically, according to the period of time t elapsing before the collision takes place as shown in FIG. 13. For the sake of convenience, FIG. 12 is an explanatory view showing the case in which the road curvature 1/R is 0, more specifically, the case in which the lane central position coincides with the central axis of the vehicle. In FIG. 13, the horizontal axis indicates the time t [sec], and the vertical axis indicates the target yaw rate YrTScdl (t) [rad/s].

Figure 14:
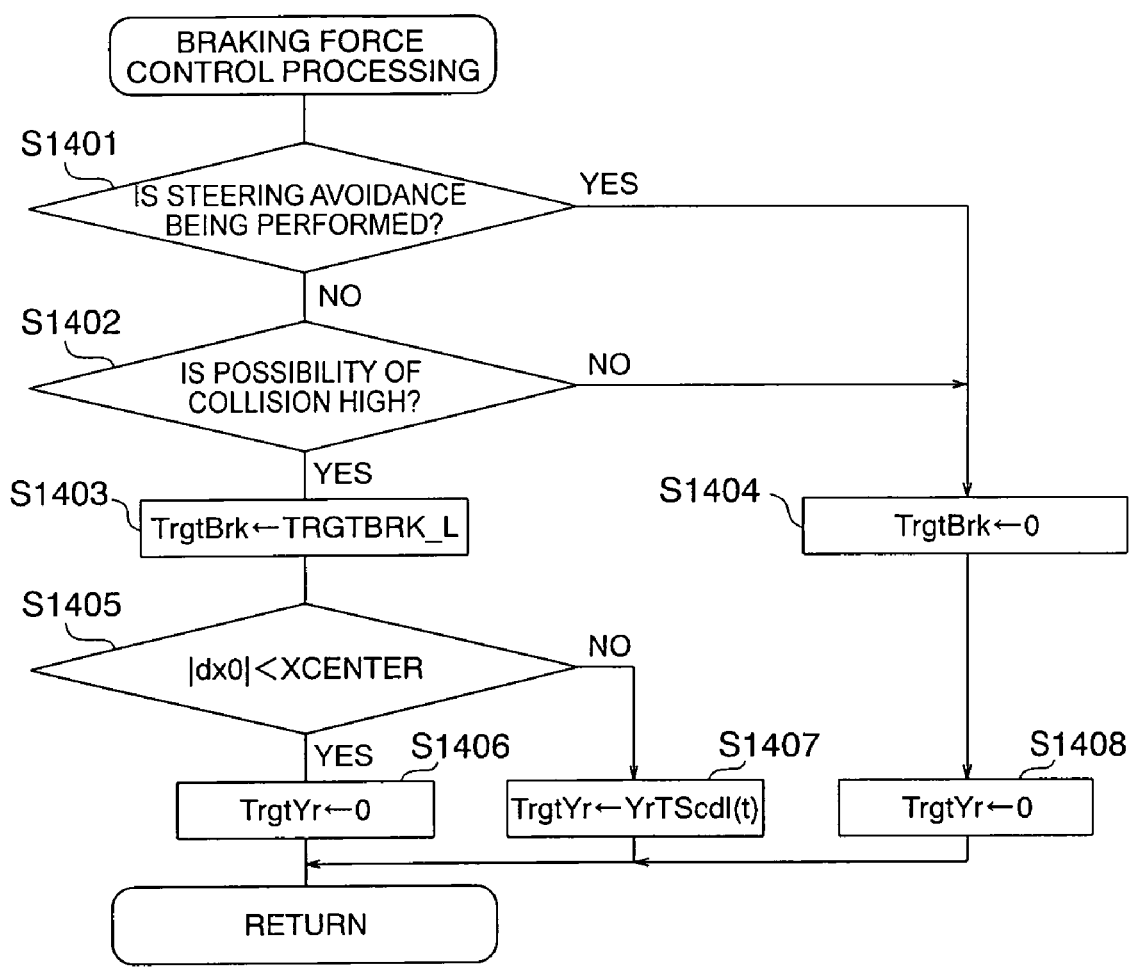
FIG. 14 is a flowchart for illustrating in detail a braking force control processing of the automatic vehicle braking device according to Embodiment 3 of the present invention.

In step S909, the target values of the braking force to be generated in the vehicle and of the yaw moment are produced based on the judgment result of the collision judgment processing S907, the offset amount obtained by the offset amount computing processing S906, and the judgment result of the steering avoidance judgment processing S904. FIG. 14, which will be referred to below, is a detailed flowchart illustrating the processing of step S909.

The processing illustrated in FIG. 14 will be described. FIG. 14 is a detailed flowchart illustrating the braking force control processing in step S909.

First, in step S1401, using the judgment result of the steering avoidance judgment processing of step S904, a judgment is made as to whether the driver is performing steering avoidance or not. When the driver is performing steering avoidance, it is determined that there is no need to operate the device, and the procedure advances to step S1404. Otherwise, the procedure advances to step S1402.

In step S1402, the judgment result of the collision judgment processing of step S907 is used to make a judgment as to whether the possibility of collision is high or not. When the possibility of collision is high, the procedure advances to step S1403. Otherwise (that is, when the possibility of collision is low or zero), it is determined that there is no need to operate the device, and the procedure advances to step S1404.

In step S1403, to operate the device to brake the vehicle, the target braking force TrgtBrk is set at a predetermined amount TRGTBRK_L.

In step S1404, the target braking force TrgtBrk is set at 0.

In step S1405, the absolute value of the lateral position dx0 of the obstacle with respect to the travel route curve is compared with a predetermined value XCENTER. When |dx0|<XCENTER, it is determined that there is no need to correct the travel route, and the procedure advances to step S1406. Otherwise, the procedure advances to step S1407 to correct the travel route to effect head-on collision.

In step S1406, the target yaw rate TrgtYr is set at 0. As a result, a target braking force of TRGTBRK_L and a target yaw rate of zero are given to the brake actuator 811, so uniform braking forces are generated in the right and left wheels, and the vehicle is braked, with no turning property of the vehicle being imparted due to the braking force obtained through control of the controller 801.

As shown in FIG. 13, in step S1407, the target yaw rate TrgtYr is set at a desired yaw rate YrTScdl (t) according to the period of time t elapsing until the collision takes place. As a result, a target braking force of TRGTBRK_L and a target yaw rate based on dx0 are given to the brake actuator 811, so different braking forces are generated in the right and left wheels. In this way, the vehicle is braked, with a turning property of the vehicle to cause head-on collision being imparted by the braking force obtained through control by the controller 801.

In step S1408, the target yaw rate TrgtYr is set at 0. As a result, the vehicle is not braked.

As described above, in this embodiment, in a condition in which the driver is unconscious of a possibility of collision and steering avoidance action has not been taken by the driver yet although there is a high possibility of the vehicle colliding with an obstacle, braking is effected while imparting no turning property of the vehicle when the absolute value of the lateral position dx0 of the obstacle with respect to the travel route curve is smaller than XCENTER, and when the absolute value is larger than XCENTER, a turning property to cause head-on collision is imparted in order to control the vehicle to achieve a desired yaw rate according to the period of time t elapsing until the collision takes place.

Thus, according to this embodiment, in a case in which one's vehicle is about to make an offset collision with an obstacle, the braking forces generated in the right and left wheels of the vehicle are controlled individually. As a result, the turning property of the vehicle is enhanced to make it possible to automatically cause head-on collision. Thus, in addition to the conventional effect of mitigating the damage suffered by the vehicle occupants by reducing the vehicle speed, it is possible to attain the effect of further mitigating the damage of the vehicle occupants as compared with the case of offset collision. Further, there is an advantage in that the vehicle attitude can be precisely adjusted until collision takes place as compared with the case of Embodiment 1.

Embodiment 4

The device construction of this embodiment is the same as that of FIG. 10. The processing flow is also the same as that of FIG. 11 except for the braking force control processing of step S909.

The braking force control processing of step S909 of this embodiment will be described in detail.

Figure 17:
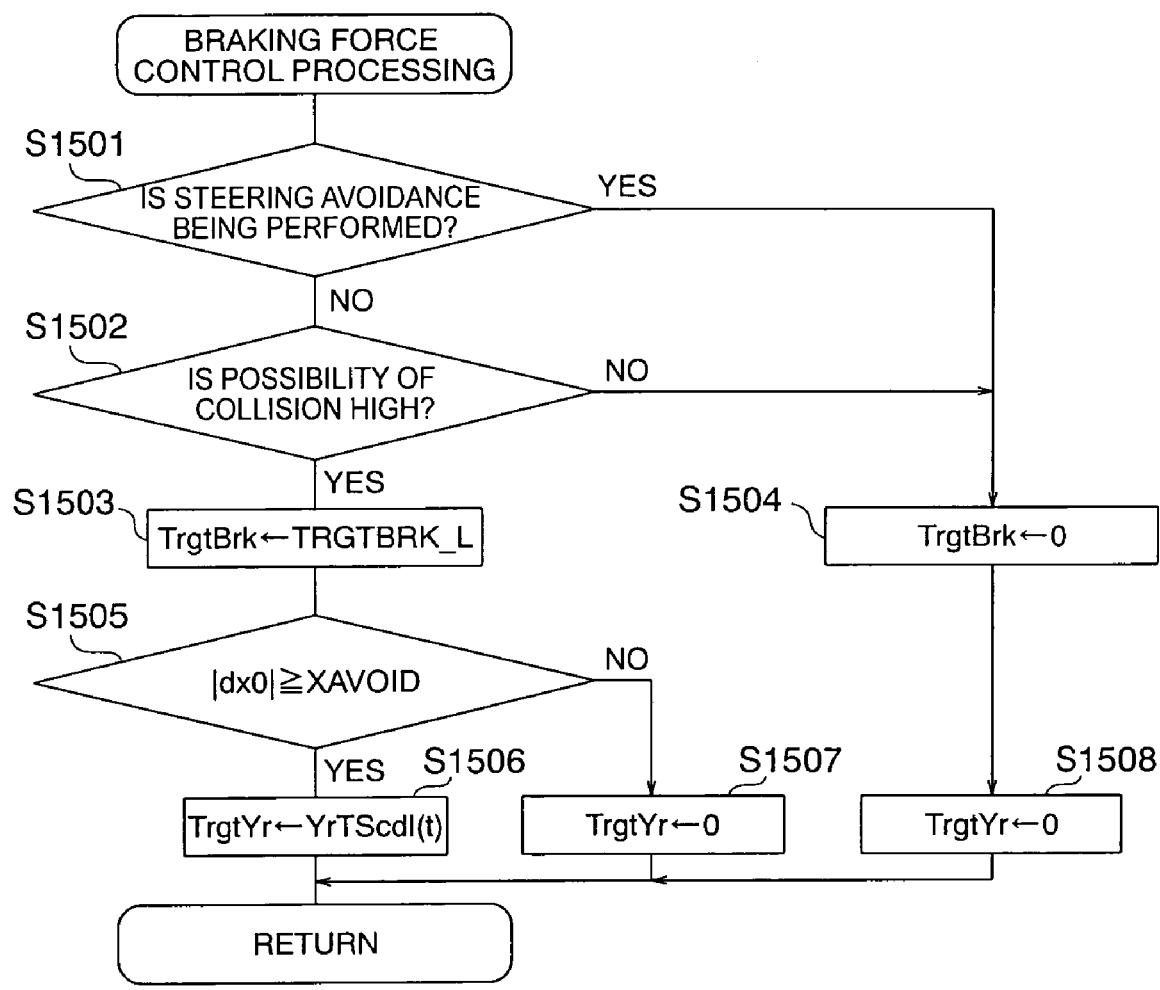
FIG. 17 is a flowchart for illustrating in detail a braking force control processing of the automatic vehicle braking device according to Embodiment 4 of the present invention.

FIG. 17 is a detailed flowchart illustrating the processing.

In step S1501, using the judgment result of the steering avoidance judgment processing of step S904, a judgment is made as to whether the driver is performing steering avoidance or not. When he is performing steering avoidance, it is determined that there is no need to operate the device, and the procedure advances to step S1504. Otherwise, the procedure advances to step S1502.

In step S1502, the judgment result of the collision judgment processing of step S907 is used to make a judgment as to whether the possibility of collision is high or not. When the possibility of collision is high, the procedure advances to step S1503. Otherwise, it is determined that there is no need to operate the device, and the procedure advances to step S1504.

In step S1503, to operate the device to brake the vehicle, the target braking force TrgtBrk is set at a predetermined amount TRGTBRK_L.

In step S1504, the target braking force TrgtBrk is set at 0.

In step S1505, the absolute value of the lateral position dx0 of the obstacle with respect to the travel route curve is compared with a predetermined threshold value XAVOID. When |dx0|≧XAVOID, the procedure advances to step S1506 to correct the travel route to avoid collision. Otherwise, it is determined that there is no need to correct the travel route, and the procedure advances to step S1507.

Figure 15:
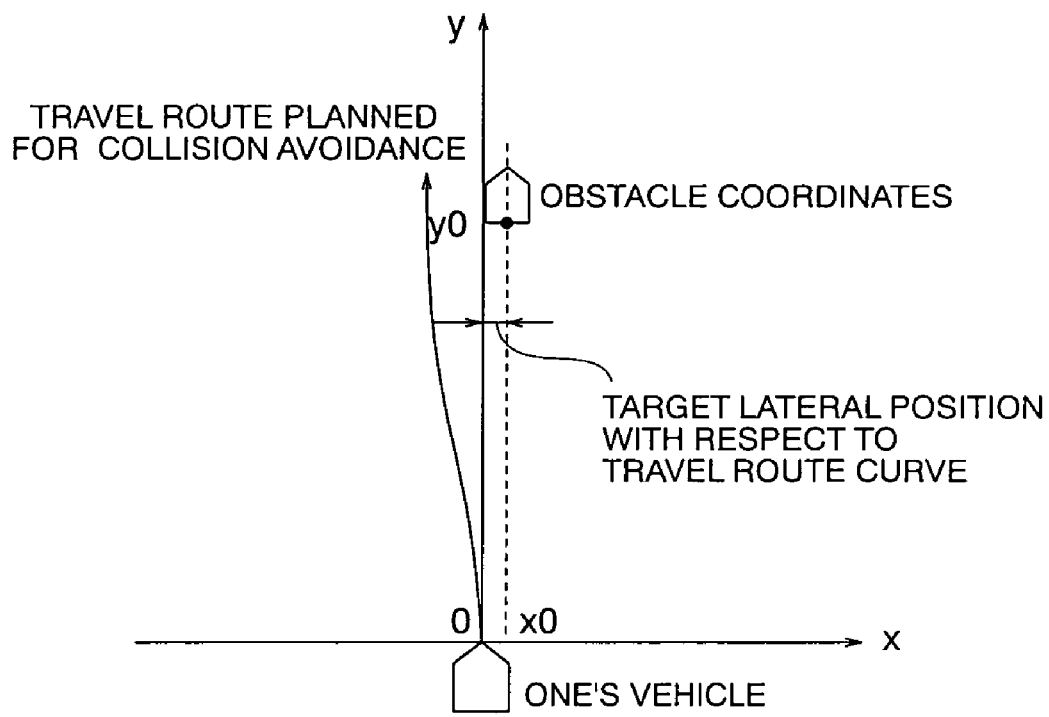
FIG. 15 is an explanatory view for illustrating a travel route planned for collision avoidance of an automatic vehicle braking device according to Embodiment 4 of the present invention.
Figure 16:
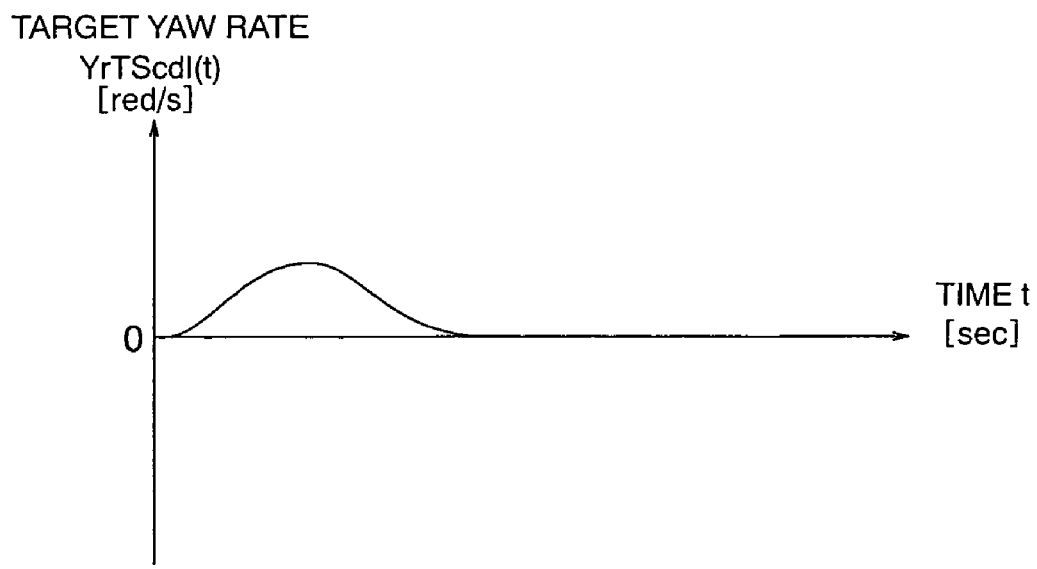
FIG. 16 is an explanatory view for illustrating a target yaw rate for realizing a travel route for collision avoidance of the automatic vehicle braking device according to Embodiment 4 of the present invention.

As shown in FIG. 16, in step S1506, the target yaw rate TrgtYr is set at a desired yaw rate YrTScdl (t) according to the period of time t that elapses until collision takes place. The target yaw rate of FIG. 16 corresponds to the travel route for avoiding collision as shown in FIG. 15 to be taken by one's vehicle, which is planned only once when, in the collision judgment processing S907, transition is effected from a state in which there is no possibility of collision to a state in which there is a high possibility of collision. As a result, a target braking force of TRGTBRK_L and a target yaw rate based on dx0 are given to the brake actuator 811, so different braking forces are generated in the right and left wheels. In this way, the vehicle is braked, with the turning property of the vehicle to avoid collision being imparted by the braking forces obtained through control by the controller 801.

In step S1507, the target yaw rate TrgtYr is set at 0. As a result, a target braking force of TRGTBRK_L and a target yaw rate of zero are given to the brake actuator 811, so uniform braking forces are generated in the right and left wheels, and the vehicle is braked, with no turning property of the vehicle being imparted due to the braking force obtained through control of the controller 101.

In step S1508, the target yaw rate TrgtYr is set at 0. As a result, the vehicle is not braked.

As described above, in this embodiment, in a condition in which the driver is unconscious of a possibility of collision, that is, in a case in which steering avoidance action has not been taken by the driver yet although there is a high possibility of the vehicle colliding with an obstacle, braking is effected while imparting no turning property of the vehicle when the absolute value of the lateral position dx0 of the obstacle with respect to the travel route curve is smaller than XAVOID, and, when the absolute value is larger than XAVOID, to control the vehicle to have a predetermined yaw rate according to the period of time t that elapses until collision takes place, a turning property to avoid collision is imparted based on the value of dx0.

Thus, according to this embodiment, when one's vehicle is about to make an offset collision with an obstacle, the braking forces generated in the right and left wheels of the vehicle are controlled individually, whereby the turning property of the vehicle is enhanced to automatically avoid collision. Thus, it is possible to allow the driver leeway in taking steering avoidance action, which may be performed immediately before collision. Further, there is no need to take measures to excessively enhance the turning property of the vehicle as in JP 7-21500 A. Further, as compared to the case in Embodiment 1 of the present invention, it is possible to advantageously adjust the posture of the vehicle until the collision takes place.

Embodiment 5

The device construction of this embodiment is the same as that of FIG. 10. Further, the processing flow is also the same as that of FIG. 11 except for the collision judgment processing in step S907 and the braking force control processing in step S909.

Figure 18:
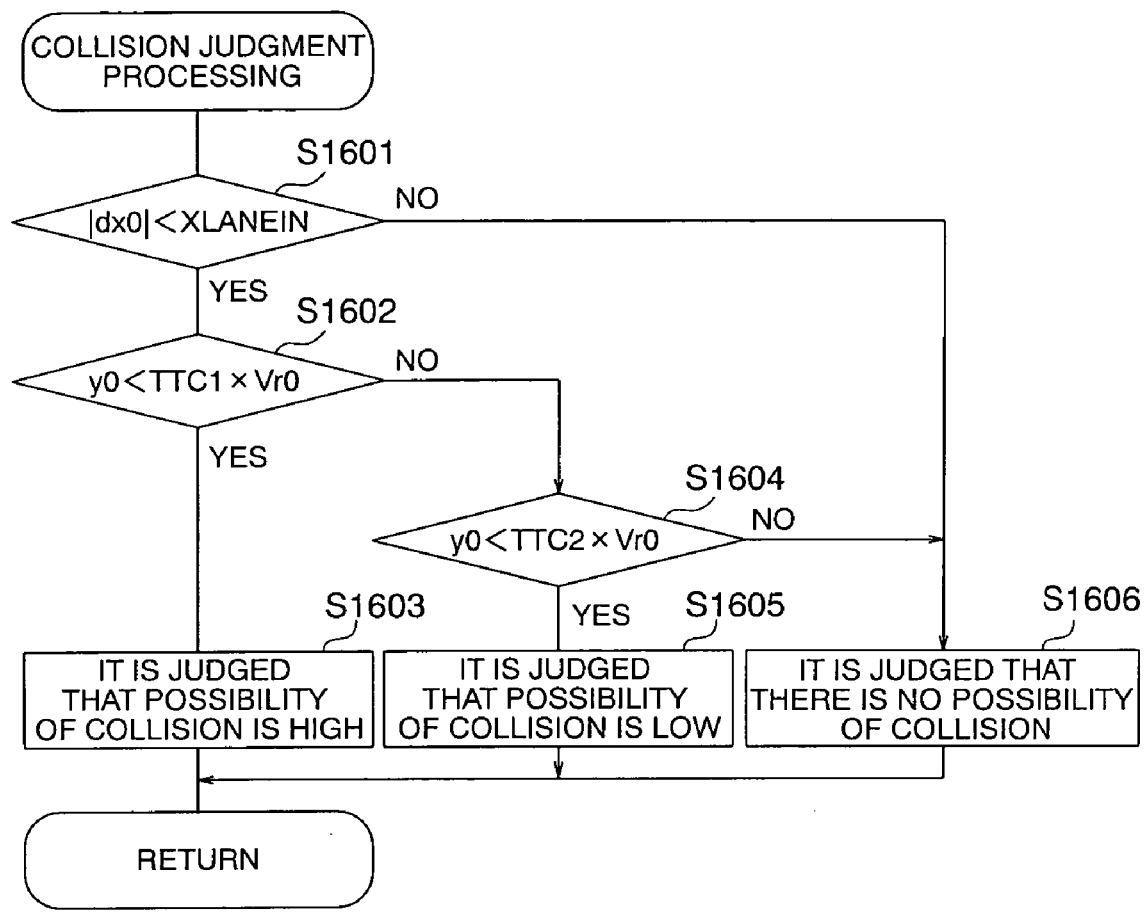
FIG. 18 is a flowchart for illustrating in detail a collision judgment processing for an automatic vehicle braking device according to Embodiment 5 of the present invention.

The collision judgement processing in step S907 according to this embodiment will be described. FIG. 18 is a detailed flowchart illustrating the processing.

In step S1601, the absolute value of the lateral position dx0 of the obstacle with respect to the travel route curve is compared with a predetermined value XLANEIN [m]. When |dx0|<XLANEIN, the procedure advances to step S1602. Otherwise, the procedure advances to step S1604.

Figure 19:
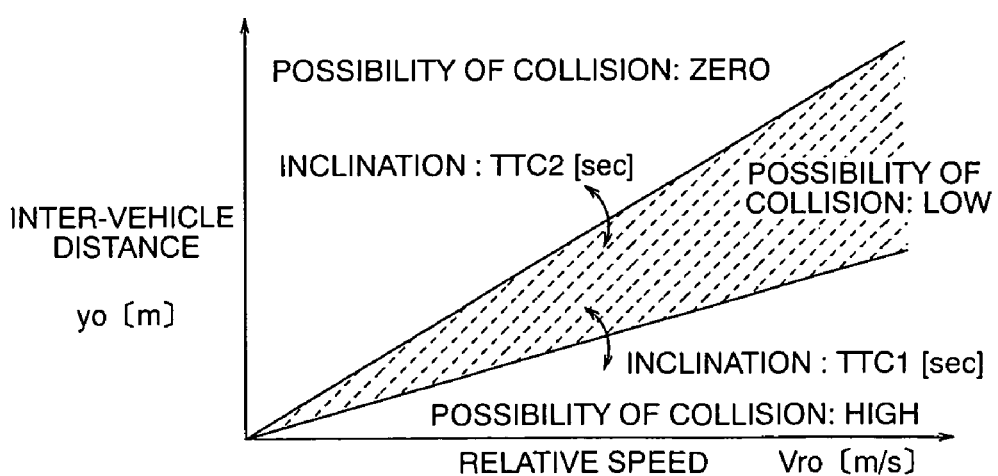
FIG. 19 is an explanatory view for illustrating a steering avoidance limit inter-vehicle distance for the collision judgment processing for the automatic vehicle braking device according to Embodiment 5 of the present invention.

In step S1602, the distance y0 to the obstacle is compared with a distance obtained by multiplying a predetermined collision prediction time TTC1 by the relative speed Vr0 of the obstacle (that is, the value of (TTC1×Vr0)), and, by using the distance y0 to the obstacle and the relative speed Vr0, a judgment is made as to whether the obstacle is an object belonging to the region where the possibility of collision is high of FIG. 19. In FIG. 19, the horizontal axis indicates the relative speed (Vr0 [m/s]), and the vertical axis indicates the inter-vehicle distance (y0 [m]). The drawing provides a graph of y0=TTC1×Vr0 and a graph of y0=TTC2×Vr0 and the region therebetween (that is, the region where y0≧TTC1× Vr0 and y0<TTC2×Vr0) is shaded. When the judgment result in step S1602 is y0<TTC1×Vr0, the procedure advances to step S1603. Otherwise, the procedure advances to step S1604. The collision prediction time TTC1 is set such that the distance obtained from TTC1×Vr0 is the physical avoidance limit allowing collision avoidance by steering.

In step S1604, the distance y0 to the obstacle is compared with a distance obtained by multiplying a predetermined collision prediction time TTC2 (which is set to be a larger value than TTC1) by the relative speed Vr0 of the obstacle, and, by using the distance y0 to the obstacle and the relative speed Vr0, a judgment is made as to whether the obstacle is an object belonging to the region where the possibility of collision is low of FIG. 19. When the judgment result is y0<TTC2×Vr0, the procedure advances to step S1605. Otherwise, the procedure advances to step S1606.

In step S1603, it is judged that the possibility of collision is high.

In step S1605, it is judged that the possibility of collision is low.

In step S1606, it is judged that there is no possibility of collision.

The collision prediction times TTC1 and TTC2 (TTC1<TTC2) are values that are defined as the requisite time for one's vehicle to collide with the obstacle ahead or the requisite time for one's vehicle to make lateral movement over a specific collision avoidance width assuming that there is no change in the relative speed of one's vehicle and the obstacle ahead.

The braking force control processing of step S909 of this embodiment will be described in detail.

Figure 20:
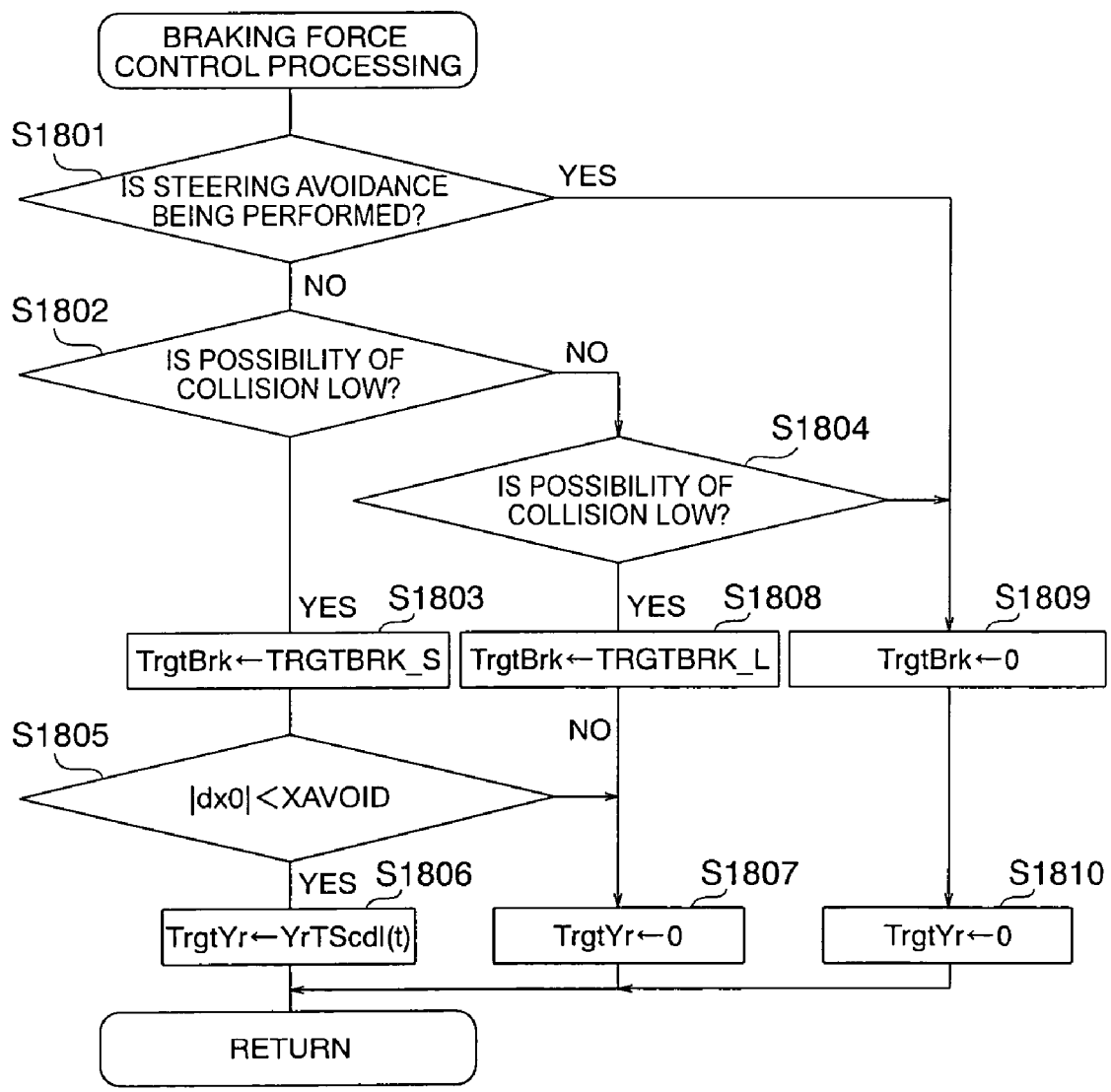
FIG. 20 is a flowchart for illustrating in detail a braking force control processing for the automatic vehicle braking device according to Embodiment 5 of the present invention.

FIG. 20 is a detailed flowchart illustrating the processing.

In step S1801, using the judgment result of the steering avoidance judgment processing of step S904, a judgment is made as to whether the driver is performing steering avoidance or not. When he is performing steering avoidance, it is determined that there is no need to operate the device, and the procedure advances to step S1809. Otherwise, the procedure advances to step S1802.

In step S1802, the judgment result of the collision judgment processing of step S907 is used to make a judgment as to whether the possibility of collision is low or not. When the possibility of collision is low, the procedure advances to step S1803. Otherwise, the procedure advances to step S1804.

In step S1803, to operate the device to brake the vehicle, the target braking force TrgtBrk is set at a predetermined amount TRGTBRK_S (where TRGTBRK_S<TRGTBRK_L).

In step S1804, the judgment result of the collision judgment processing of step S907 is used to make a judgment as to whether the possibility of collision is high or not. When the possibility of collision is high, the procedure advances to step S1808. Otherwise, it is determined that there is no need to operate the device, and the procedure advances to step S1809.

In step S1805, the absolute value of the lateral position dx0 of the obstacle with respect to the travel route curve is compared with a predetermined threshold value XAVOID. When |dx0|≧XAVOID, the procedure advances to step S1806 to correct the travel route to avoid collision. Otherwise, it is determined that there is no need to correct the travel route, and the procedure advances to step S1807.

As shown in FIG. 16, in step S1806, the target yaw rate TrgtYr is set at a desired yaw rate according to the period of time t that elapses until collision takes place. The target yaw rate of FIG. 16 corresponds to the travel route for avoiding collision as shown in FIG. 15 to be taken by one's vehicle, which is planned only once when, in the collision judgment processing S907, transition is effected from a state in which there is no possibility of collision to a state in which there is a high possibility of collision. As a result, a target braking force of TRGTBRK_L and a target yaw rate based on dx0 are given to the brake actuator 811, so different braking forces are generated in the right and left wheels. In this way, the vehicle is braked, with the turning property of the vehicle to avoid head-on collision being imparted by the braking forces obtained through control by the controller 801.

In step S1807, the target yaw rate TrgtYr is set at 0. As a result, a target braking force of TRGTBRK_L or of TRGTBRK_S and a target yaw rate of zero are given to the brake actuator 811, so uniform braking forces are generated in the right and left wheels, and the vehicle is braked, with no turning property of the vehicle being imparted by the braking force obtained through control of the controller 101.

In step S1808, to operate the device to brake the vehicle, the target braking force TrgtBrk is set at a predetermined amount TRGTBRK_L (where TRGTBRK_S is smaller than TRGTBRK_L).

In step S1809, the target braking force TrgtBrk is set at 0.

In step S1810, the target yaw rate TrgtYr is set at 0. As a result, the vehicle is not braked.

As described above, according to this embodiment, in a condition in which the driver is unconscious of an offset collision about to take place between one's vehicle and an obstacle and in which the driver has taken no steering avoidance action yet, when the absolute value of the lateral position dx0 of the obstacle with respect to the travel route curve is smaller than XAVOID, braking is effected with no vehicle turning property imparted, and when the absolute value is larger than XAVOID, a turning property to avoid collision is imparted to control the vehicle to a desired yaw rate according to the period of time t elapsing until the collision takes place based on the value of dx0, where the distance y0 to the obstacle is restricted to the range between the distance (TTC1×Vr0) constituting the avoidance limit physically allowing avoidance of collision through steering and a distance (TTC2×Vr0) allowing the driver leeway to some degree in performing steering avoidance. When the possibility of one's vehicle colliding with the obstacle becomes higher, solely braking is effected with no turning property imparted.

Thus, according to the present invention, the turning property of the vehicle is enhanced to automatically avoid collision, with the distance to the obstacle being restricted to a range where the distance (TTC1×Vr0) constituting the limit physically allowing avoidance of collision through steering has not been reached, that is, in a condition in which the possibility of collision is still not so high. Thus, when there is uncertainty as to whether the driver will perform steering avoidance (while collision is unavoidable even if steering avoidance is performed), exclusively a reduction in vehicle speed is achieved through braking, and when the driver ought to be inclined to perform steering avoidance (i.e., there is room for collision avoidance through steering), collision avoidance is effected automatically. As a result, it is possible to adapt the device operation to the intention of the driver. Further, as in Embodiment 4, it is possible to give the driver leeway in taking a steering avoidance action, which may be conducted immediately before collision, and there is no need to take measures to excessively enhance the turning property of the vehicle as in JP 07-21500 A.

Embodiment 6

While in Embodiment 2, Embodiment 4, and Embodiment 5 a vehicle turning property is created based on the lateral position dx0 of the obstacle with respect to the travel route curve, the same effect can be obtained if, as in JP 2005-28992 A, a vehicle turning property is created according to the lap ratio when it is assumed that one's vehicle is to collide with an obstacle based on width-related information such as the width of the obstacle and its position in the width direction with respect to the vehicle.

Embodiment 7

While in the devices of Embodiment 2, Embodiment 4, and Embodiment 5 solely an obstacle existing in front of one's vehicle is monitored to automatically avoid collision with the obstacle, this should not be construed restrictively. It is also possible to provide rearward detection means for detecting an obstacle existing at a right or left rearward position and to monitor an obstacle in the rear as well as the one ahead, keeping the device from operating when an obstacle exists in the direction in which collision avoidance is to be effected. As a result, it is possible to achieve a further improvement in terms of safety in causing one's vehicle to effect collision avoidance (lateral movement).

What is claimed is:

1. An automatic vehicle braking device of a vehicle comprising:
    detection means for detecting a relative distance, lateral position, and speed of an obstacle with respect to the vehicle;
    an offset amount means for calculating an offset amount between a vehicle travel route and the lateral position of an obstacle;
    collision judgment means for making a judgment as to whether a possibility of collision between one's vehicle and the obstacle exists based on detection values obtained by the detection means and the position of the obstacle with respect to the offset amount output by the offset amount means;
    steering operation detecting means for detecting a steering operation by a driver of the vehicle; and
    braking force control means for causing a braking force to be exerted on each wheel to brake the vehicle when it is judged by the collision judgment means that a possibility of collision exists and when the steering operation detecting means has detected no collision avoidance operation performed by the driver,
    wherein the braking force control means causes a respective braking force to be exerted on each wheel to turn the vehicle in a direction in which a head-on collision between the vehicle and the obstacle is caused, wherein the vehicle is simultaneously braked and turned based on at least the relative lateral position of the obstacle with respect to the vehicle detected by the detection means.

2. The automatic vehicle braking device according to claim 1, further comprising: collision travel route planning means for sequentially planning a travel route for head-on collision between one's vehicle and the obstacle based on the relative distance and lateral position of the obstacle detected by the detection means,
    wherein the braking force control means causes a braking force to be exerted on each wheel to trace the travel route planned by the collision travel route planning means.

3. The automatic vehicle braking device according to claim 1, wherein braking forces generated in right and left wheels of the vehicle are controlled individually.

4. The automatic vehicle braking device according to claim 1, wherein the collision judgment means compares the relative distance of the obstacle with respect to the vehicle with a distance obtained by multiplying a predetermined collision prediction time by the speed of the obstacle.

* * * * *